J. M. Harrison,
Hand Planter.
No. 111,202. Patented Jan. 24, 1871.
Fig. 1.
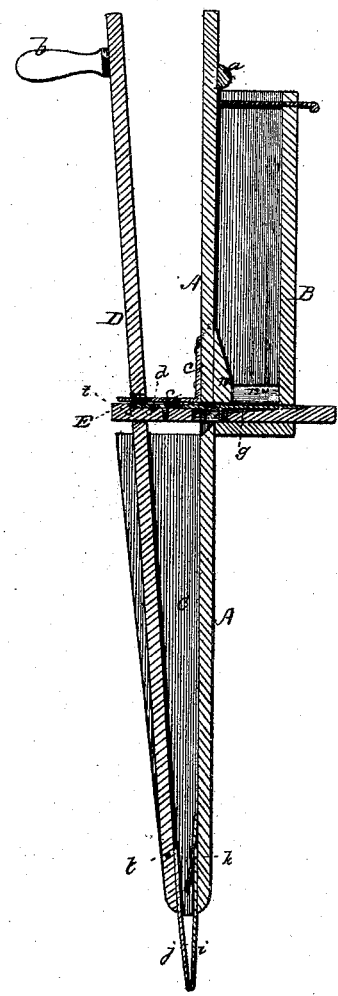
Fig. 2.
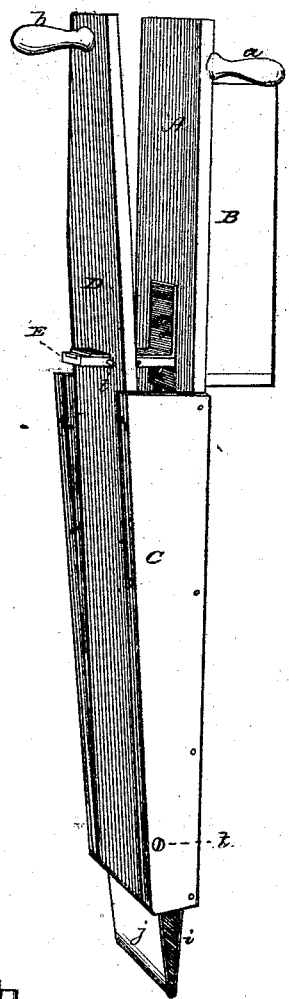
Fig. 4.
Fig. 3.
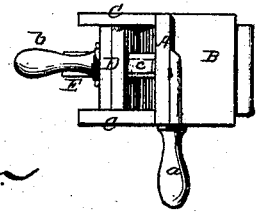
Witnesses,
L. Hailes
Phil. T. Dodge
Inventor,
J. M. Harrison
by Dodge & Munn
his Atty's

United States Patent Office.

JAMES M. HARRISON, OF SPARTANBURG, INDIANA.

Letters Patent No. 111,202, dated January 24, 1871.

IMPROVEMENT IN HAND CORN-PLANTERS.

The Schedule referred to in these Letters Patent and making part of the same.

*To all whom it may concern:*

Be it known that I, JAMES M. HARRISON, of Spartanburg, in the county of Randolph and State of Indiana, have invented certain Improvements in Hand Corn-Planter, of which the following is a specification, reference being had to the accompanying drawing.

My invention relates to certain improvements in that class of hand corn-planters consisting of two boards or levers, hinged together at their lower ends, and provided with handles, a seed-slide, seed-hopper, &c.

The invention consists in placing the handles by which the planter is held and operated at right angles to each other; in providing the seed-slide with a spring arm and an outside guard-plate; in attaching a lip between the lower ends of the levers, to hold the corn while the planter is being forced into the ground; and in securing certain blocks in the bottom of the hopper to guide the slide and relieve it from pressure.

Figure 1 represents a vertical section of my planter, taken on the line x x of fig. 3;

Figure 2 is a perspective view of the planter;

Figure 3, a top plan view of the same; and

Figure 4, a cross-section of the seed-slide and hopper-bottom.

The body of my planter I construct in the common and well-known manner by taking a flat wooden strip or bar, A, and attaching to its edges two cheek-pieces C, and pivoting between these cheek-pieces a second bar or lever, D, and also attaching to the back side of the lever A a seed-hopper, B, as shown in figs. 1 and 2.

Heretofore it has been usual to provide the upper end of each of the levers with a handle by which to hold and operate the planter and to place these handles with their axes in line. But, when thus arranged, the hands of the operator were brought into such positions in operating the planter as to render the operation exceedingly tiresome and laborious.

This difficulty I avoid by placing the two handles at right angles to each other, as shown in fig. 3, by which simple change the planter is rendered much easier and less tiresome to operate.

Through the lower end of the hopper B I make a horizontal opening and insert therein a seed-slide, F, having a vertical opening, *f*, through it near the middle, and pass the end of this slide through the lever D and insert a pin, *t*, therein on each side of the lever, as shown in figs. 1 and 2, so that, as the levers A D are closed together and drawn apart, the seed-slide is given a reciprocating motion in the hopper.

By this motion of the slide, its hole or seed-cell *f* is carried within the hopper and filled with corn, and then drawn out and the corn allowed to fall out the lower side into the tube formed by the levers A D and cheek-pieces C, and so on, continuously.

As a kernel of corn in the cell *f* is liable to project above the slide, and to bind or catch as the slide is drawn outward, and thus crack the kernel or prevent the slide from operating, I attach to the upper side of the seed-slide E a spring, *g*, having its free end bent downward into, and so as to form one side of, the hole or cell *f*, as shown in fig. 1.

The wood below the spring I cut away, as shown in figs. 1 and 4, so that when a projecting kernel of corn binds, the spring will yield and let the kernel drop down and the slide move freely.

To prevent the spring *g*, when compressed, from throwing the corn upward when the slide is drawn out, I attach to the lever A a guard-plate, *c*, which rests flat upon top of the slide, as shown in figs. 1 and 2, and thereby prevents the corn from being discharged except on the under side.

In the bottom of the hopper I secure three blocks, *m m* and *n*, for the purpose of guiding the slide and relieving it, in part, from the weight of the mass of corn above.

I also provide the slide with the usual adjustable slide *d*, for varying the size of the seed-cell *f*, and thereby the quantity of corn discharged each time.

To the lower end of lever A, on the inside, between it and lever D, I secure a lip, *k*, which retains the corn at that point while the end or nose of the planter is being forced into the ground, so that when the nose of the planter is opened the corn has only a short distance to fall, and, consequently, allows the planter to be operated more rapidly than in the old style, where it was necessary to wait until the corn fell all the way from the slide.

By this contrivance it will be seen that when the lower ends of the levers are opened and a charge of corn dropped from the lip *k*, the slide is moved inward and refilled, and upon closing the levers the charge of corn is dropped onto the lip *k* from the slide, and that when this last charge is dropped from the lip the slide is again refilled, and so on, a charge of corn being always held close to the ground.

In operating my planter the upper ends of the levers A D are drawn apart, and the lower end of the planter forced into the ground, and the levers closed together, so as to deposit the corn into the hole formed by the end of the planter. The planter is then lifted up, the levers drawn apart, and the previous operation repeated.

The planter thus constructed is strong, cheap, and simple, and may be operated with great ease and rapidity.

Having thus described my invention,
What I claim is—

1. The combination of the levers A and D with the slide E, having the spring plate *g* applied thereto, and the guard-plate *c*, all arranged to operate as described.

2. The detainer plate, or lip *k*, arranged between the levers A and D, near their lower end, as described, for the resention of the charge of grain, as set forth.

JAMES M. HARRISON.

Witnesses:
A. J. DOWING,
WM. A. MILLER.